(12) United States Patent
Nishioka

(10) Patent No.: US 7,185,122 B2
(45) Date of Patent: Feb. 27, 2007

(54) DEVICE AND METHOD FOR CONTROLLING DATA TRANSFER

(75) Inventor: Naotoshi Nishioka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 253 days.

(21) Appl. No.: 10/762,667

(22) Filed: Jan. 22, 2004

(65) Prior Publication Data

US 2004/0153589 A1  Aug. 5, 2004

(30) Foreign Application Priority Data

Jan. 27, 2003  (JP) ............................ P2003-017681

(51) Int. Cl.
*G06F 13/00*  (2006.01)
*G06F 13/24*  (2006.01)
*G06F 13/36*  (2006.01)
*G06F 13/20*  (2006.01)

(52) U.S. Cl. ..................... 710/34; 710/33; 710/48; 710/52

(58) Field of Classification Search ............. 710/5, 710/22, 33, 34, 48; 711/154, 167
See application file for complete search history.

(56) References Cited

U.S. PATENT DOCUMENTS 5,857,114 A * 1/1999 Kim ........................ 710/22
6,816,921 B2 * 11/2004 Jahnke et al. ................ 710/22
2003/0172229 A1 * 9/2003 Takasugi et al. ............ 711/112
2004/0073721 A1 * 4/2004 Goff et al. .................... 710/22
2005/0210221 A1 * 9/2005 Mitsuishi ..................... 712/39

FOREIGN PATENT DOCUMENTS

JP  05-276221  10/1993
JP  2000-322375  11/2000

OTHER PUBLICATIONS

Japanese Patent Office, "Notice of Rejection in connection with Japanese Patent Application No. 2003-017681," (Sep. 12, 2006).

* cited by examiner

*Primary Examiner*—Kim Huynh
*Assistant Examiner*—Scott Sun
(74) *Attorney, Agent, or Firm*—Pillsbury Winthrop Shaw Pittman LLP

(57) ABSTRACT

A data transfer control device and method is devoted to control data transfer (i.e., DMA transfer) between a main memory whose storage capacity is arbitrarily set and a buffer memory (e.g., a FIFO memory) incorporated in a peripheral module, wherein a first register is arranged to store a first value representing a first number of times for transferring m-bit data to suit the storage capacity of the buffer memory, and a second register is arranged to store a second value representing a second number of times for transferring m-bit data to match the amount of transferring data stored in the main memory. A controller is arranged to control transferring of m-bit data based on the first value while controlling writing operations for the buffer memory. It determines the timing to output an interrupt signal to a CPU managing the main memory on the basis of the second value.

9 Claims, 5 Drawing Sheets

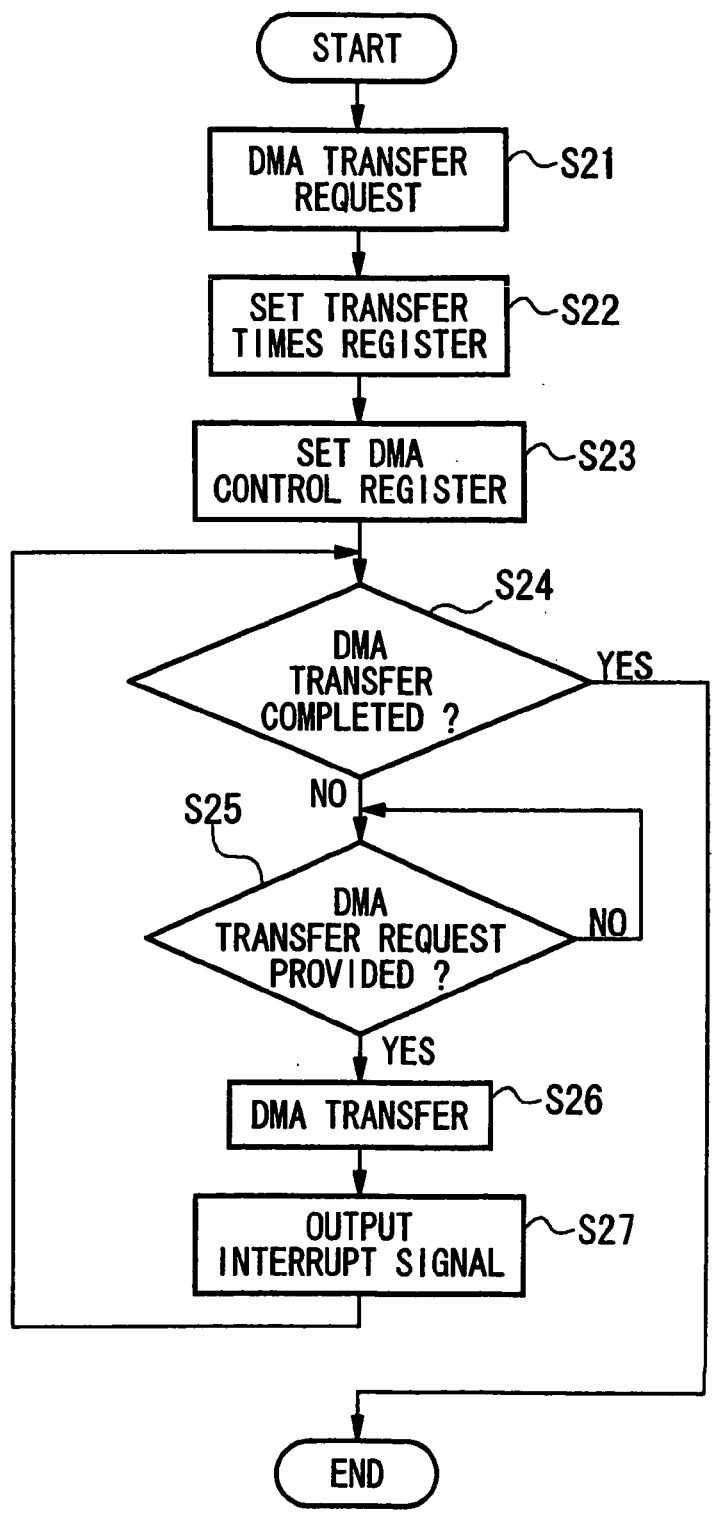

DEVICE AND METHOD FOR CONTROLLING DATA TRANSFER

BACKGROUND OF THE INVENTION

1. Field of the Invention

This invention relates to devices and methods for controlling data transfer such as DMA (Direct Memory Access) transfer using DMA controllers realizing reductions of interrupt processes with respect to central processing units (CPUs).

This application claims priority on Japanese Patent Application No. 2003-17681, the content of which is incorporated herein by reference.

2. Description of the Related Art

In general, systems having memories incorporate DMA (Direct Memory Access) controllers in order to reduce loads of CPUs (Central Processing Units), wherein peripheral modules for supporting functions of CPU communication devices and storage devices output DMA requests to DMA controllers so as to actualize data transfer based on the DMA system between source addresses and destination addresses, an example of which is disclosed in Japanese Patent Application Publication No. Hei 5-276221. In order to improve an efficiency in transferring data from a main memory of the system (or a system memory) having a great storage capacity to a peripheral module, the peripheral module must include a buffer memory (e.g., a first-in-first-out (FIFO) memory) having a small storage capacity for use in data transfer, whereby when transferring large-scale data stored in the main memory to the buffer memory of the peripheral module, the data are transferred in multiple divisions to suit the capacity of the buffer memory.

Next, a description will be given with respect to data-transfer procedures for transferring data of a system memory to a buffer memory incorporated in a peripheral module with reference to a flowchart shown in FIG. 5. Herein, the user of the system describes instructions regarding DMA requests in a program to be executed by a CPU in advance. During the process of executing the program, the CPU detects a DMA request that is described by the user in step S21. Upon detection of the DMA request, the CPU sets a certain number of times for transferring data per one DMA request into a transfer times register arranged in a DMA controller based on the stored content of the buffer memory incorporated in the peripheral module, which is a data-transfer destination, in step S22. In addition, the CPU stores the total number of times for transferring data in accordance with the amount of transferring data. Furthermore, the CPU sets a prescribed value representing a method how to designate addresses in transferring data to a DMA control register in step S23.

In step S24, a decision is made as to whether or not a DMA transfer is completed. When a decision result of step S24 is 'NO' (indicating that the DMA transfer is not completed), the flow proceeds to step S25 in which a decision is made as to whether or not the peripheral module provides a DMA request. The following steps S25–S27 are performed by the DMA controller. When a decision result of step S25 is 'YES' (representing that the peripheral module provides a DMA request), the flow proceeds to step S26 in which a DMA transfer is performed. After completion of a single DMA transfer, an interrupt signal is output to the CPU in step S27. Upon reception of such an interrupt signal, the CPU performs an interrupt process in accordance with an interrupt program. That is, the CPU performs an interrupt process at each time when receiving an interrupt signal. The foregoing step S24 designates an interrupt process as well. After completion of step S27, the flow returns to step S24. Thus, similar operations are repeatedly performed until the DMA transfer is completed with respect to all data of the main memory (or system memory) that should be subjected to transferring.

According to the conventionally-known data transfer described above, the CPU may frequently incur interrupts during the DMA transfer process. This raises a problem in that the CPU incurring numerous interrupts suffers from an excessively great overhead. Normally, a first-in-first-out memory (i.e., a buffer memory) for use in data transfer has a relatively small storage capacity that matches several tens of bytes, for example. This reduces the amount of data, which is subjected to DMA transfer in a certain period of time from the timing that the DMA controller receives a DMA request to the timing that the CPU is interrupted, to several tens of bytes at best. It may be generally known that an overhead of several micro-seconds or so occurs per single interrupt in a microcomputer in which an operating system (OS) is installed. As described above, the amount of data transferred per single DMA transfer must be limited to the storage capacity of the buffer memory, which is a transferring destination, or less. Therefore, as the storage capacity of the buffer memory is reduced, the CPU must frequently incur numerous interrupts.

SUMMARY OF THE INVENTION

It is an object of the invention to provide a data transfer control device that can reduce the number of times interrupts are incurred in a CPU when transferring data from a main memory to a buffer memory incorporated in a peripheral module, wherein the amount of transferring data is not restricted by the storage capacity of the buffer memory.

A data transfer control device of this invention is devoted to control data transfer (i.e., DMA transfer) between a main memory whose storage capacity is arbitrarily set and a buffer memory (i.e., a FIFO memory) incorporated in a peripheral module, wherein a first register is arranged to store a first value representing a first number of times for transferring m-bit data (where 'm' is an integer arbitrarily set, e.g., '32') to suit the storage capacity of the buffer memory, and a second register is arranged to store a second value representing a second number of times for transferring m-bit data to match the amount of transferring data stored in the main memory.

A controller is arranged to control transferring of m-bit data based on the first value while controlling writing operations for the buffer memory. In addition, it determines the timing to output an interrupt signal to a CPU managing the main memory on the basis of the second value.

Thus, the buffer memory is adequately filled with n-byte data comprising multiple sets of m-bit data (where 'n' is an integer arbitrarily set, e.g., '32'), which are sequentially transferred thereto from the main memory so that the number of times for actually performing data transfer matches the first value set to the first register. When all the transferring data stored in the main memory are completely subjected to transferring, the number of times for actually performing data transfer matches the second value set to the second register, so that the controller outputs an interrupt signal to the CPU to incur an interrupt.

Due to the aforementioned procedures, it is possible to smoothly and rapidly perform DMA data between the main memory and the buffer memory without being restricted by the storage capacity of the buffer memory; and it is therefore possible to reduce the number of times for causing interrupts in the CPU.

BRIEF DESCRIPTION OF THE DRAWINGS

These and other objects, aspects, and embodiments of the present invention will be described in more detail with reference to the following drawings, in which:

FIG. 5 is a flowchart showing procedures of a conventionally-known DMA transfer method.

DESCRIPTION OF THE PREFERRED EMBODIMENT

This invention will be described in further detail by way of examples with reference to the accompanying drawings.

Figure 1:
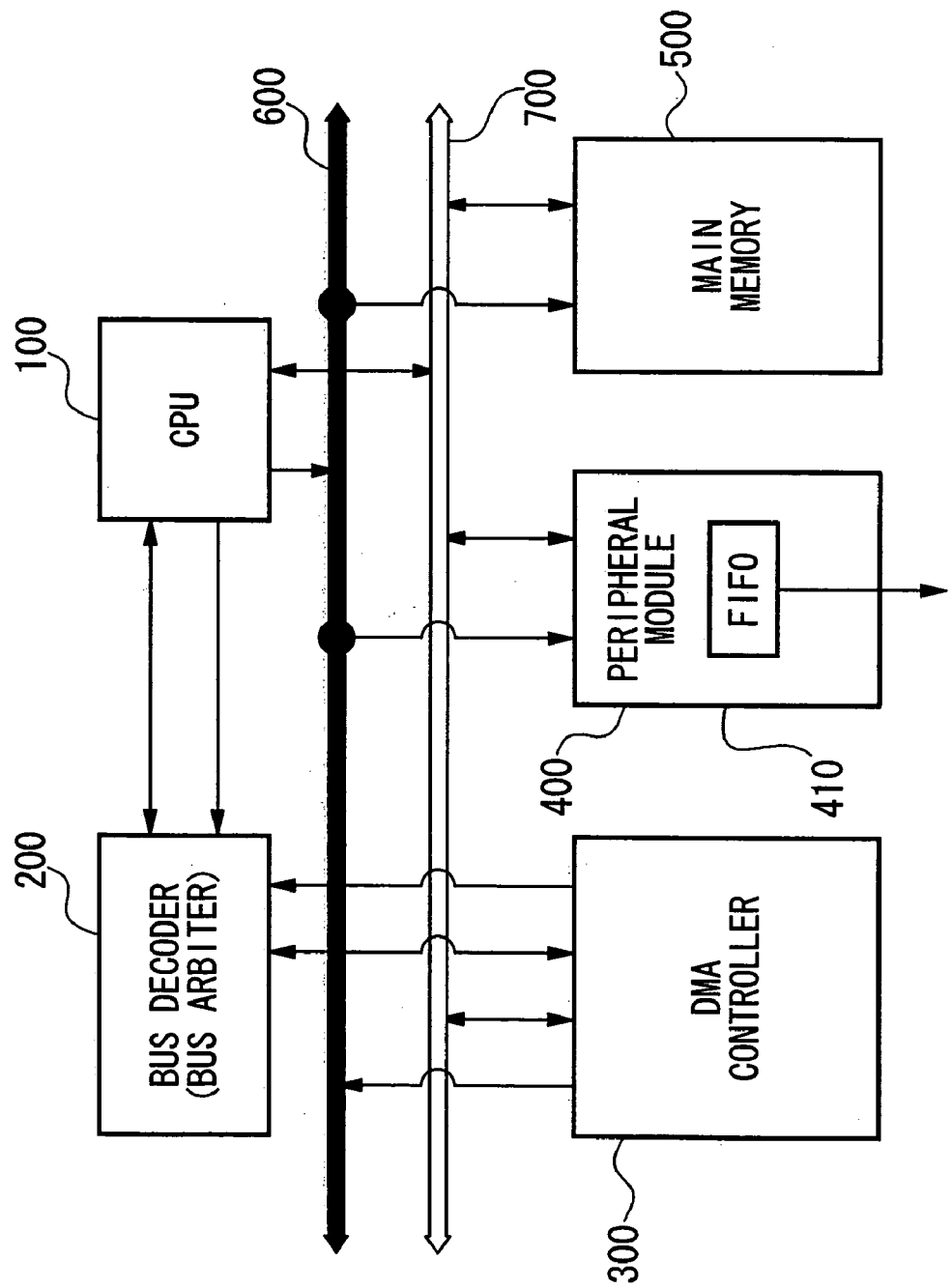
FIG. 1 is a block diagram showing a system constitution to which a data transfer control device is adapted in accordance with a preferred embodiment of the invention.

FIG. 1 shows a system constitution to which a data transfer control device is adapted in accordance with a preferred embodiment of the invention. This system is designed to suit an electronic musical instrument, for example, which performs data processing over multiple channels. In FIG. 1, reference numeral 100 designates a central processing unit (CPU), 200 designates a bus decoder having a bus arbiter function, 300 designates a DMA (Direct Memory Access) controller (corresponding to the data transfer control device of the present embodiment), 400 designates a peripheral module for supporting functions of a CPU communication device and a storage device externally arranged, 410 designates a first-in-first-out (FIFO) memory having a data-transfer buffer function, and 500 designates a main memory whose storage capacity is arbitrarily set. As described above, the FIFO memory 410 serves as a data-transfer buffer memory incorporated in the peripheral module 400. In the present embodiment, it has a 32-byte storage capacity.

Figure 2:
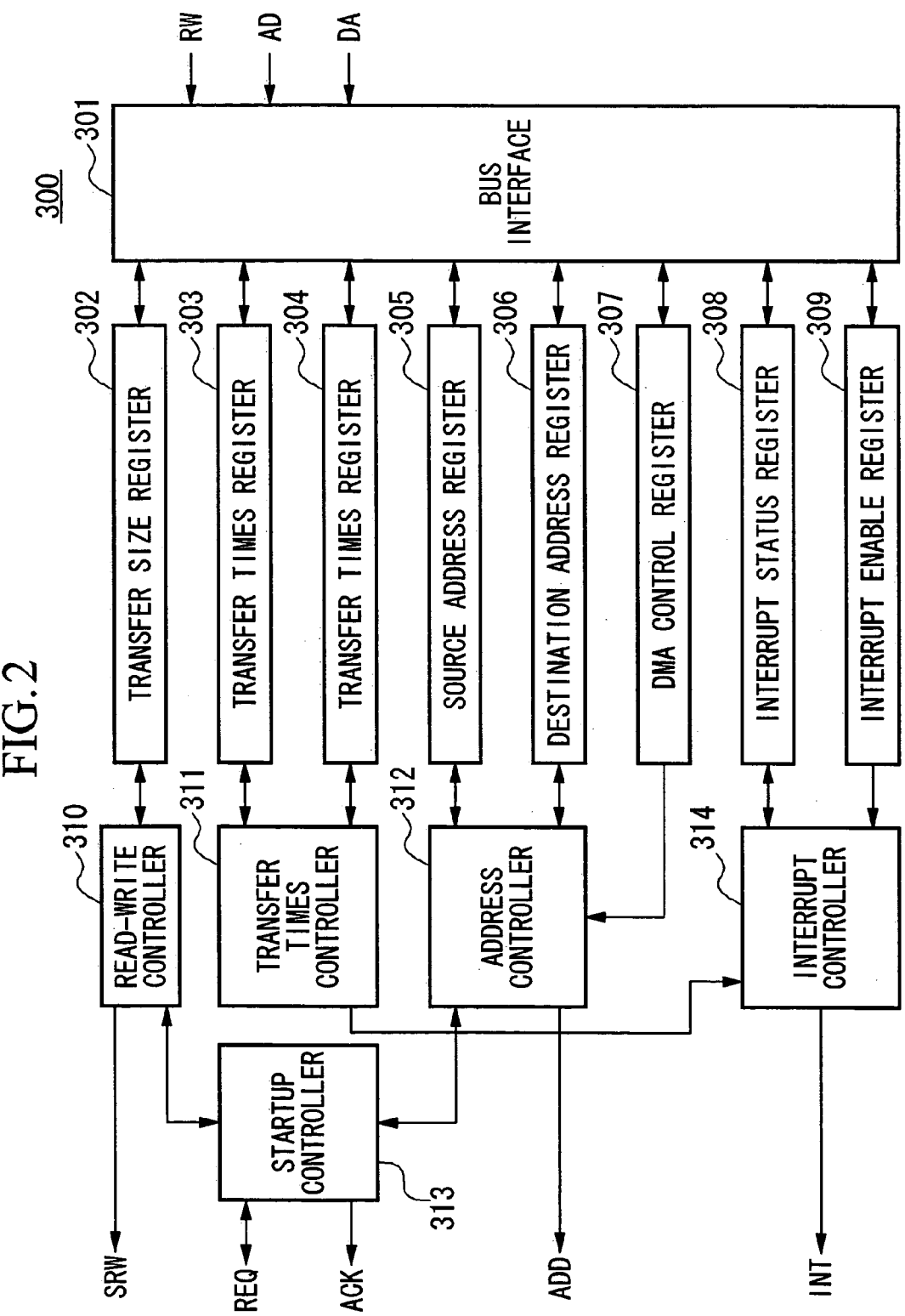
FIG. 2 is a block diagram showing an internal constitution of a DMA controller shown in FIG. 1.

FIG. 2 shows an internal constitution of the DMA controller 300. Specifically, the DMA controller 300 comprises a bus interface 301, a transfer size register 302, transfer times registers 303 and 304, a source address register 305, a destination address register 306, a DMA control register 307, an interrupt status register 308, an interrupt enable register 309, a read-write controller 310, a transfer times controller 311, an address controller 312, a startup controller 313, and an interrupt controller 314. The aforementioned registers 302–309 are connected with the bus interface 301, which in turn receives various control signals for setting their values from the CPU 100, namely, a read-write control signal RW, an address signal AD, and a data signal DA.

The aforementioned registers and controllers are mutually connected together. That is, the transfer size register 302 is connected with the read-write controller 310; the transfer times registers 303 and 304 are connected with the transfer times controller 311; the source address register 305, the destination address register 306, and the DMA control register 307 are connected with the address controller 312; and the interrupt status register 308 and the interrupt enable register 309 are connected with the interrupt controller 314. In addition, both of the read-write controller 310 and the address controller 312 are connected with the startup controller 313. The transfer times controller 311 is connected with the interrupt controller 314. The aforementioned controllers 310–314 input and output various signals, namely, a read-write control signal SRW, a DMA request signal REQ, a DMA acknowledge signal ACK, and an address signal ADD, all of which are used to control the peripheral module 400 and the memory 500 under the DMA controller 300, as well as an interrupt signal INT that causes an interrupt in the CPU 100.

Figure 3:
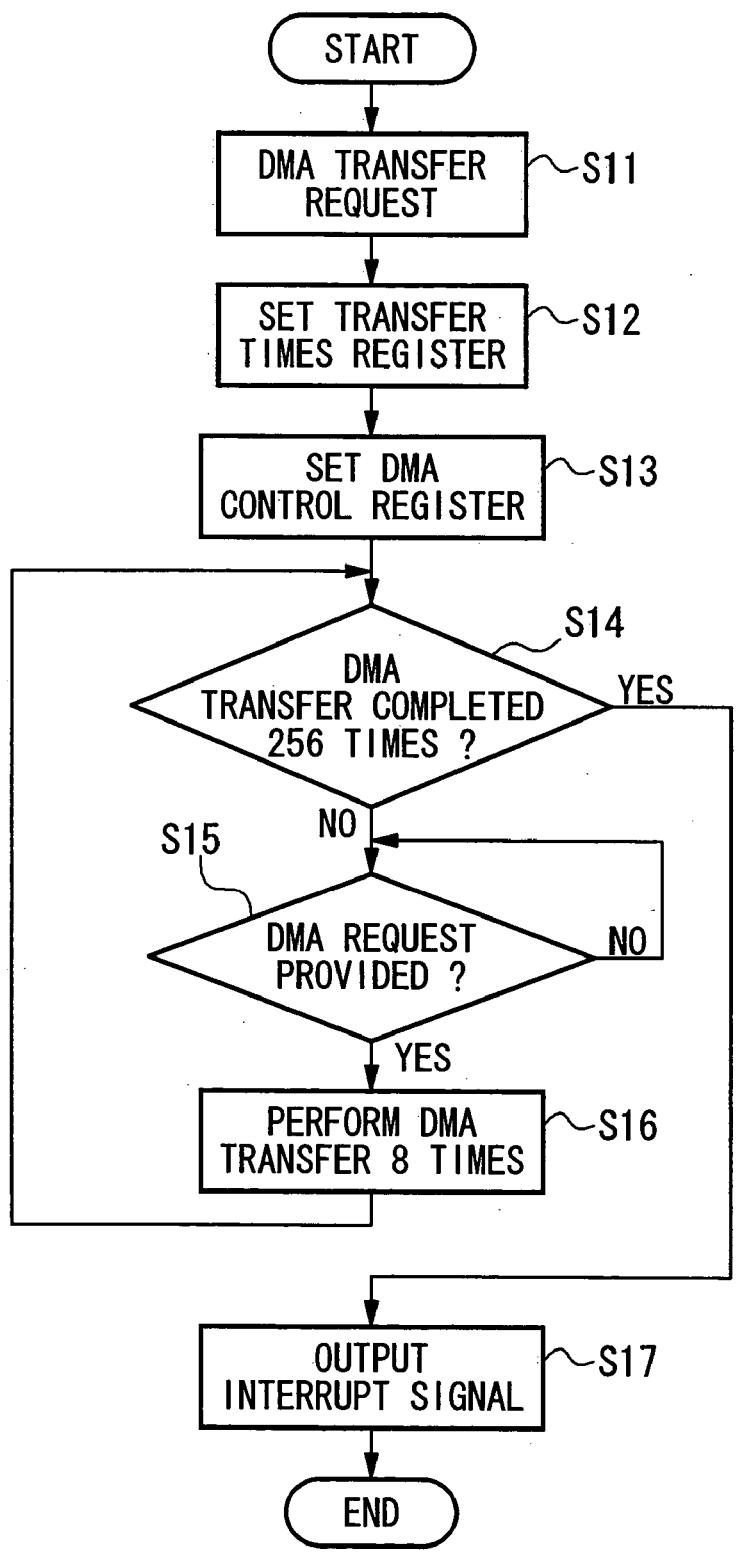
FIG. 3 is a flowchart showing a system operation regarding DMA transfer executed in accordance with the embodiment of the invention.

Next, the overall operation of the system of FIG. 1 will be described with reference to the flowchart shown in FIG. 3, in particular, with regard to an example in which 1024-byte data stored in the main memory 500 are subjected to DMA transfer to the peripheral module 400.

First, the user of the system describes instructions regarding DMA requests, by which data are transferred from the main memory 500 to the FIFO memory 410 incorporated in the peripheral module 400, in a program to be executed by the CPU 100 in advance. These instructions (or program data) are stored in the main memory 500 together with transferring data. Thus, the CPU 100 reads the instructions from the main memory 500 so as to execute them, so that it detects a DMA request in step S11.

Upon detection of the DMA request, the CPU 100 sets adequate values to various registers such as the transfer times register 303 and 304, and the DMA control register 307 in step S12 and S13. Specifically, a transfer size (i.e., a certain number of bits or a word length) for the data being transferred from the main memory 500 to the peripheral module 400 is set to the transfer size register 302. The transfer size is specifically determined in advance in the design stage of the system, wherein in the present embodiment, it is set to a value representing thirty-two bits (i.e., a long word). A value representing a number of times for transferring data of the aforementioned size (i.e., 32-bit data) output from the main memory 500 is set to the transfer times register 303. The aforementioned number of times for transferring data is set to suit the storage capacity of the FIFO memory 410, wherein data of the aforementioned size (e.g., 32-bit data) are transferred multiple times to satisfy the storage capacity of the FIFO memory 410. In the present embodiment, the storage capacity of the FIFO memory 410 is set to 32-byte (equals 32-bit×8); therefore, a value representing '8' (equals 32-byte/32-bit) is set to the transfer times register 303.

Another value regarding the number of times for transferring 32-bit data is set to the transfer times register 304 so as to define the amount of transferring data stored in the main memory 500. In the present embodiment, the main memory 500 stores transferring data of 1024 bytes; therefore, a value representing '256' (equals 1024-byte/32-bit) is set to the transfer times register 304. A top address of the transferring data stored in the main memory 500 (corresponding to a transfer source) is set to the source address register 305; and a fixed address allocated to the FIFO memory 410 (corresponding to a transfer destination) is set to the destination address register 306.

A value representing a method how to designate the destination address is set to the DMA control register 307, wherein the fixed address allocated to the FIFO memory 410 is designated. Herein, it is possible to adequately set the value representing the method how to designate the destination address in response to the specification regarding addresses of the peripheral module 400. That is, when the transfer destination corresponds to a RAM (a random-access memory), a prescribed value representing an addressing method for sequentially incrementing and designating addresses regarding storage locations is set to the DMA control register 307. The interrupt status register 308 and the interrupt enable register 309 are used to set conditions for making determination whether to allow an interrupt signal INT to be outputted. Specifically, a value designated by the CPU 100 is set to the interrupt status register 308, and a value for selecting a channel subjected to processing is set to the interrupt enable register 309.

Upon completion of setting of various registers under the control of the CPU 100, the DMA controller 300 starts to perform DMA transfer operations. That is, the flow proceeds to step S14 in which the transfer times controller 311 makes a decision as to whether or not the number of times for performing DMA transfer reaches the aforementioned value (i.e., '256') set in the transfer times register 304. When a decision result of step S14 is 'NO' (representing that the number of times for performing DMA transfer does not reach the aforementioned value set in the transfer times register 304), the flow proceeds to step S15 in which a decision is made as to whether or not the startup controller 313 received (or accepted) a DMA request. When a decision result of step S15 is 'NO' (representing that the startup controller 313 has not yet received the DMA request), the DMA controller 300 is set in a standby state for a while.

When the startup controller 313 receives a first DMA request so that the decision result of step S15 turns to 'YES', the flow proceeds to step S16 in which the address controller 312 produces an address signal ADD in accordance with the addressing method represented by the value set to the DMA controller 307, thus outputting it to the peripheral module 400. Herein, the DMA transfer is repeatedly performed by the aforementioned number of times (i.e., eight times) set to the transfer times register 303, so that data are sequentially transferred from the main memory 500 to the FIFO memory 410. This will be described in further detail with reference to FIG. 4. In step S16, within the transferring data of 1024 bytes stored in the main memory 500, first 32-byte data D1 is divided into eight sections (i.e., eight sets of 32-bit data), which are sequentially transferred to the FIFO memory 410 via a data register 411 in the peripheral module 400. Thus, the FIFO memory 410 is occupied with the 32-byte data D1, which is then read out to an external device (not shown).

After completion of the step S16, the flow returns to step S14 in which as described above, the transfer times controller 311 makes a decision again as to whether or not the DMA transfer is completely performed by the aforementioned number of times (i.e., 256 times) set to the transfer times register 304. In this stage, the total number of times for performing DMA transfer is "eight", which does not reach the number of times set to the transfer times register 304. Then, the flow proceeds to step S15 in which a decision is made as to whether or not the startup controller 313 receives a new DMA request. When the startup controller 313 receives it, the flow proceeds to step S16 in which next 32-byte data D2 (see FIG. 4) is divided into eight sections (i.e., eight sets of 32-bit data divided in accordance with the value (i.e., eight) set to the transfer times register 303), which are sequentially subjected to DMA transfer. Thus, the 32-byte data D2 are completely transferred to the FIFO memory 410 and are then read out to the external device. In this stage, the total number of times for performing DMA transfer is increased to "sixteen", which does not reach the aforementioned number of times (i.e., 256 times) set to the transfer times register 304.

Figure 4:
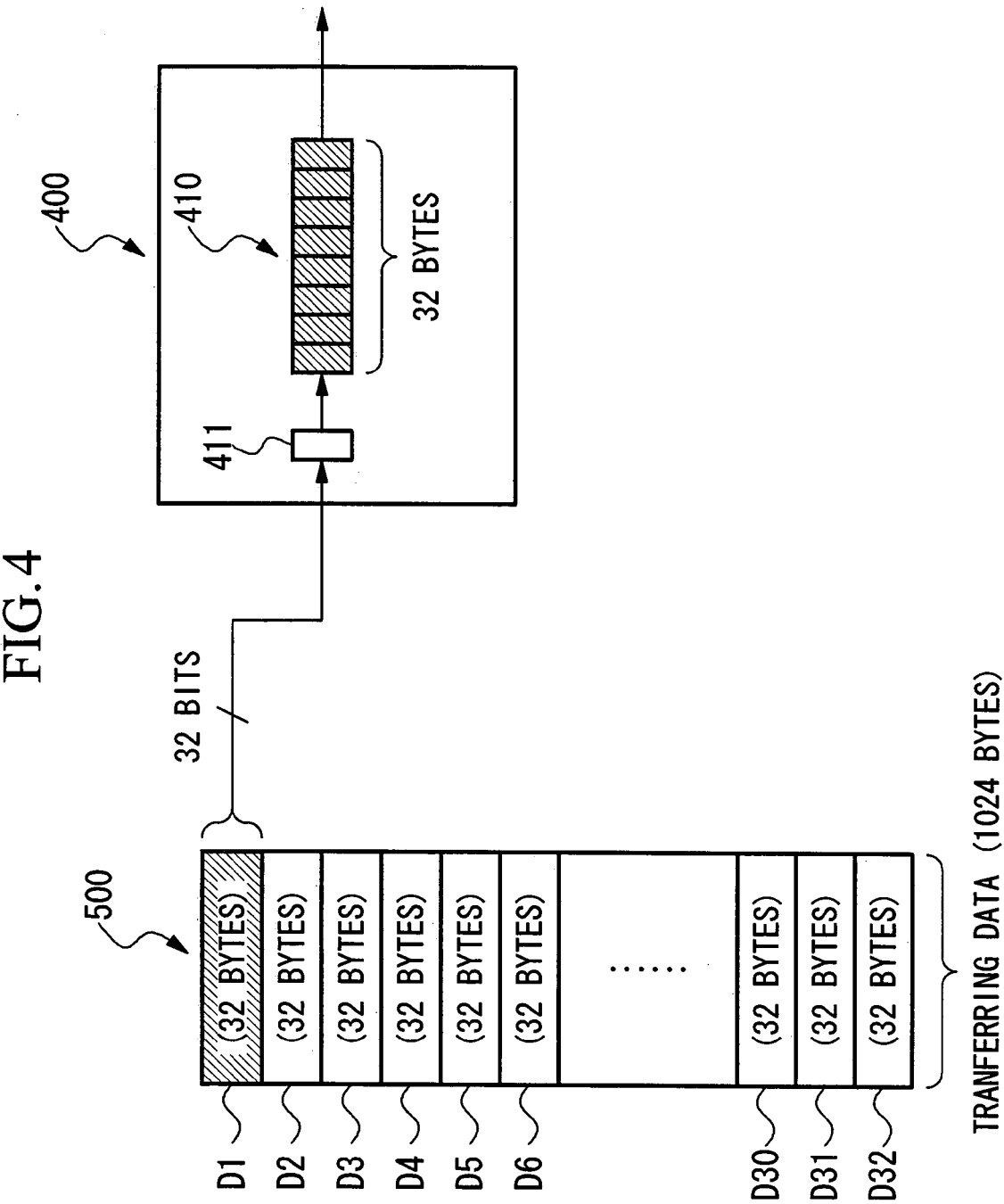
FIG. 4 is a simplified block diagram showing a data configuration subjected to DMA transfer to a buffer memory incorporated in a peripheral module.

All the transferring data of 1024 bytes stored in the main memory 500 are divided into thirty-two sets of 32-byte data D1–D32 as shown in FIG. 4; therefore, the DMA transfer actualized by the aforementioned steps S14–S16 is repeatedly performed with respect to subsequent data D3–D32 respectively. As a result, the total number of times for performing DMA transfer in step S16, which is counted in the step S14, finally reaches the aforementioned number of times (i.e., 256 times) set to the transfer times register 304. That is, the decision result of step S14 turns to 'YES', so that the flow proceeds to step S17. At this time, when the interrupt controller 314 determines with reference to the values set to the interrupt status register 308 and the interrupt enable register 309 that the CPU 100 is allowed to cause an interrupt, it outputs an interrupt signal INT to the CPU 100 in step S17. Thus, the DMA controller 300 completes a series of DMA transfer operations.

This invention is not necessarily limited to the present embodiment described above; therefore, it is possible to embrace a variety of design choices and modifications without departing from the essential matter of this invention. For example, the aforementioned step S16 is designed to repeatedly perform DMA transfer eight times, so that 32-byte data are divided into eight sets of 32-bit data. Of course, it is not always required that the number of times for transferring each data block reach "eight" because the amount of each data block may vary; for example, if the amount of the last data block D32 is less than thirty-two bytes, it is not required to perform DMA transfer eight times with respect to the last data block D32. In this case, when all transferring data are completely transferred so that no data remain, the DMA transfer is automatically stopped, and the flow is thus forced to return to step S14 from step S16. In addition, the step S14 is designed to make a decision as to whether or not the number of times for performing DMA transfer reaches the prescribed value (representing "256 times"), which is not necessarily restricted and which can be adequately set in response to the total amount of transferring data existed in the main memory 500. Incidentally, the step S16 is designed to repeatedly perform DMA transfer eight times, whereas the number of times for performing DMA transfer can be adequately set in accordance with the storage capacity of the FIFO memory 410.

As described heretofore, this invention has a variety of effects and technical advantages, which will be described below.

(1) A data transfer control device of this invention is designed such that a first value regarding the storage capacity of a transfer-destination memory (e.g., a buffer memory incorporated in a peripheral module) is set to a first register, and a second value regarding the amount of transferring data stored in a transfer-source memory (e.g., a main memory of the system) is set to a second register, whereby data transfer is performed while controlling writing operations for the transfer-destination memory based on the first value, and an interrupt signal is supplied to a CPU at the timing determined based on the second value. This allows the data transfer to be smoothly and rapidly performed on the buffer memory of the peripheral module without being restricted by the storage capacity of the buffer memory; and it is therefore possible to reduce the number of times causing interrupts for the CPU.

(2) In other words, the data transfer control device of this invention is devoted to control data transfer (i.e., DMA transfer) between a first memory whose storage capacity is set arbitrarily and a second memory that is incorporated in a peripheral module so as to serve as a buffer memory for use in data transfer, wherein a first register is arranged to store a first value representing a first number of times (e.g., 8 times) for transferring m-bit data (e.g., 32-bit data) to suit the storage capacity of the second memory, and a second register is arranged to store a second value representing a second number of times (e.g., 256 times) for transferring m-bit data to match the amount of transferring data stored in the first memory. Herein, a controller (or controllers) is arranged to control transferring of m-bit data based on the first value set to the first register while controlling writing operations for the second memory; and it also determines the timing to output an interrupt signal based on the second value set to the second register with respect to a CPU managing the first memory storing the transferring data. That is, when the number of times for performing data transfer matches the second value set to the second register, the controller outputs an interrupt signal to the CPU. Incidentally, the storage capacity of the second register is set in accordance with the storage capacity of the first memory.

(3) A data transfer control method of this invention is devoted to control data transfer (i.e., DMA transfer) between the first memory and the second memory, wherein it comprises various steps, namely, a step for setting the first value to the first register, a step for setting the second value to the second register, a step for controlling transferring of m-bit data based on the first value while controlling writing operations for the second memory, and a step for outputting an interrupt signal to the CPU managing the first memory at the timing determined based on the second value.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A data transfer control device for controlling data transfer between a first memory having a predetermined storage capacity and a second memory corresponding to a buffer memory incorporated in a peripheral module, said data transfer control device comprising:
    a first register for storing a first value representing a first number of times, by which data transfer is performed from the first memory to the second memory, the first value being determined based on a number of bits of data being output from the first memory and a storage capacity of the second memory;
    a second register for storing a second value representing a second number of times by which data transfer is performed from the first memory to the second memory, the second value being determined based on an amount of data being stored in the first memory and being transferred to the second memory and the number of bits of data being output from the first memory; and
    a controller for controlling data the data transfer from the first memory to the second memory in accordance with the first value and for outputting an interrupt signal to a when a value accumulating the number of times data transfer is performed from the first memory to the second memory matches the second value.

2. A data transfer control device according to claim 1, wherein a size of the second register is set in accordance with the predetermined storage capacity of the first memory.

3. A data transfer control device according to claim 1, wherein the transferring data are sequentially transferred from the first memory to the second memory in accordance with a Direct Memory Access transfer.

4. A data transfer control device according to claim 1, wherein the storage capacity of the second memory is set to store n-byte data (where 'n' is an integer arbitrarily set) comprising multiple sets of m-bit data, and m-bit data is the number of bits of data being output from the first memory.

5. A data transfer control method for controlling data transfer between a first memory having a predetermined storage capacity and a second memory corresponding to a buffer memory incorporated in a peripheral module, said data transfer control method comprising the steps of:
    setting a first value representing a first number of times by which data transfer is performed from the first memory to the second memory, the first value being determined based on a number of bits of data being output from the first memory and a storage capacity of the second memory;
    setting a second value representing a second number of times, by which data transfer is performed from the first memory to the second memory, the second value being determined based on an amount of data being stored in the first memory and being transferred to the second memory and the number of bits of data being output from the first memory;
    controlling transferring of the data from the first memory to the second memory in accordance with the first value; and
    outputting an interrupt signal when a value accumulating a number of times data is transferred from the first memory to the second memory reaches the second value.

6. A data transfer control method according to claim 5, wherein the transferring data are sequentially transferred from the first memory to the second memory in accordance with a Direct Memory Access transfer.

7. A data transfer control method according to claim 5, wherein the storage capacity of the second memory is set to store n-byte data (where 'n' is an integer arbitrarily set) comprising multiple sets of m-bit data and m-bit data is the number of bits of data being output from the first memory.

8. A data transfer control method according to claim 5, wherein the storage capacity of the second memory is set to store n-byte data (where 'n' is an integer arbitrarily set) comprising multiple sets of m-bit data, so that the n-byte data are collectively transferred from the first memory to the second memory by sequentially transferring the m-bit data the first number of times so as to satisfy the storage capacity of the second memory and m-bit data is the number of bits of data being output from the first memory.

9. A data transfer control device according to claim 1, wherein the first value is produced by dividing the storage capacity of the second memory by the number of bits of data being output from the first memory, and the second value is produced by dividing the amount of data being stored in the first memory and being transferred to the second memory by the number of bits of data being output from the first memory.

* * * * *